(12) United States Patent
Johnston et al.

(10) Patent No.: US 11,126,984 B2
(45) Date of Patent: Sep. 21, 2021

(54) REAL-TIME SERVICE PROCESSING

(71) Applicant: NCR Corporation, Duluth, GA (US)

(72) Inventors: Samantha Elaine Johnston, Suwanee, GA (US); Hung Banh, Suwanee, GA (US); Andre Sebastian Giron, Atlanta, GA (US); Jonathan Wesley Lawrence, Cumming, GA (US)

(73) Assignee: NCR Corporation, Atlanta, GA (US)

( * ) Notice: Subject to any disclaimer, the term of this patent is extended or adjusted under 35 U.S.C. 154(b) by 807 days.

(21) Appl. No.: 15/085,051

(22) Filed: Mar. 30, 2016

(65) Prior Publication Data
US 2017/0286935 A1    Oct. 5, 2017

(51) Int. Cl.
G06Q 30/00    (2012.01)
G06Q 20/18    (2012.01)
G06Q 30/02    (2012.01)
H04W 4/14    (2009.01)

(52) U.S. Cl.
CPC ......... G06Q 20/18 (2013.01); G06Q 30/0226 (2013.01); H04W 4/14 (2013.01)

(58) Field of Classification Search
CPC ...... G06Q 20/18; G06Q 30/0226; H04W 4/14
USPC .............................................. 705/14.4, 14.53
See application file for complete search history.

(56) References Cited

U.S. PATENT DOCUMENTS

| | | | | |
|---|---|---|---|---|
| 2003/0148775 A1* | 8/2003 | Spriestersbach | ....... | G06Q 10/10 455/456.1 |
| 2009/0048916 A1* | 2/2009 | Nuzum | ................... | G06Q 20/32 705/14.14 |
| 2013/0317993 A1* | 11/2013 | Wasserman | .......... | G06Q 30/016 705/304 |
| 2015/0149272 A1* | 5/2015 | Salmon | .............. | G06Q 30/0233 705/14.33 |

* cited by examiner

Primary Examiner — Sun M Li
(74) Attorney, Agent, or Firm — Schwegman, Lundberg & Woessner

(57) ABSTRACT

A kiosk provides a consumer-facing interface for interacting with a consumer to take an order at an enterprise location. A device identifier for a consumer-operated device and order details for the order are received through the consumer-facing interface and communicated to a remote order integration manager executing on a server external from the kiosk. The order integration manager interacts with an enterprise service system and provides updates on the order in real time to the consumer through the consumer-operated device using the device identifier.

15 Claims, 4 Drawing Sheets

REAL-TIME SERVICE PROCESSING

BACKGROUND

Consumers are embracing technology to perform a variety of transactions with enterprises. Mobile phones have allowed consumers to perform transactions on the go with enterprises, such transactions used to be reserved for desktop computers having largely wired connections to the Internet for accessing the retailer-based systems.

Some technology, in recent years, has integrated an enterprise's consumer operations with a third-party platforms to provide consumer service integration. For example Aloha® distributed by NCR® Corporation of Duluth Ga., permits consumer ordering at a retail establishment (such as a restaurant) via a kiosk and consumer payment processing through the kiosk. The ordering and payment processing is then integrated with the retailer's site and retailer's backend processing. This permits a consumer to place orders, make payments, and receive their orders in an automated fashion and permits the retailers to operate more efficiently.

However, integration of kiosk ordering and payment with consumer preferred devices (such as mobile phones) and real-time retailer services has largely remained elusive. Some companies do permit order through mobile devices or kiosks at restaurants; however, these techniques require prior customer identification either through loyalty information or a registered mobile device.

SUMMARY

In various embodiments, methods and a system for real-time service processing are provided.

According to an embodiment, a method for real-time service processing is provided. Specifically, a device identifier is received for a consumer-operated device along with order details for an order placed by a consumer from a kiosk. A status is obtained as updated from an enterprise ordering system for the order. Finally, the status is provided to the consumer-operated device in real-time using the device identifier.

DETAILED DESCRIPTION

Figure 1:
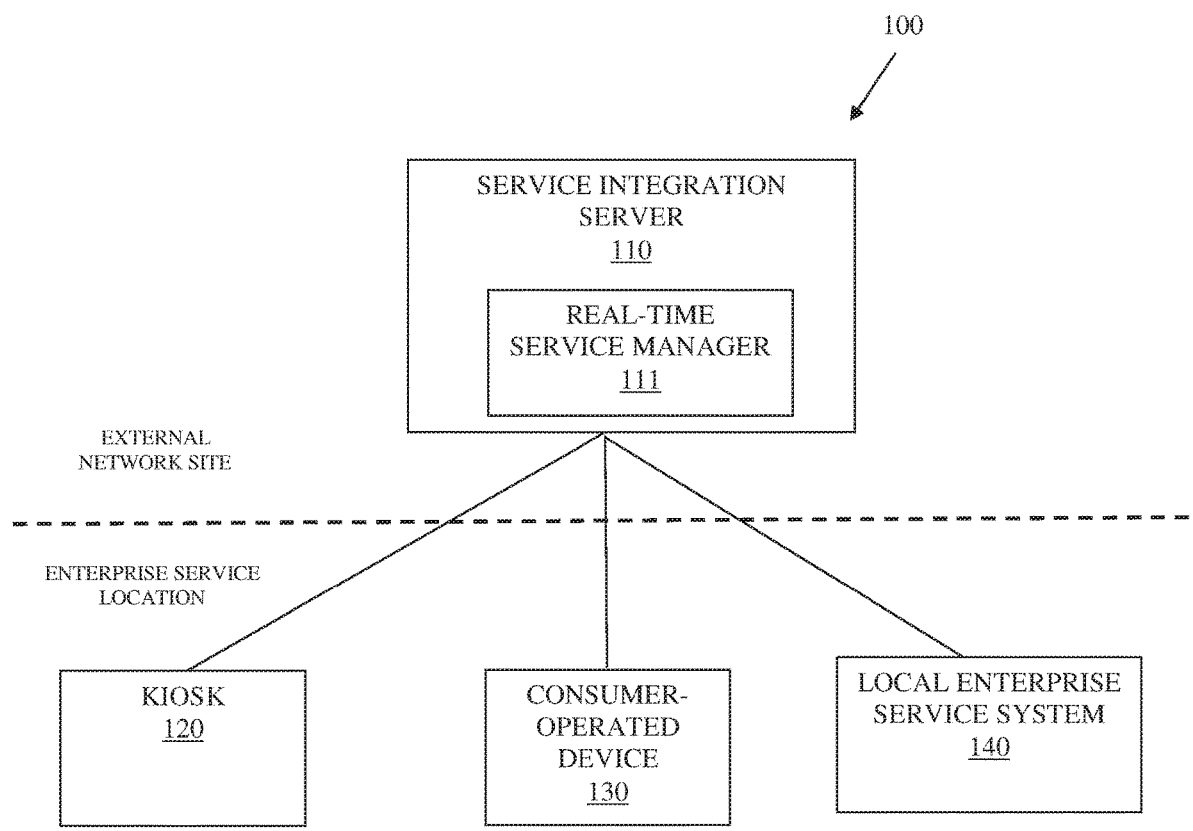
FIG. 1 is a diagram illustrating components of a real-time service processing system, according to an example embodiment.

FIG. 1 is a diagram illustrating components of a real-time service processing system 100, according to an example embodiment. It is to be noted that the real-time service processing system 100 is shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of real-time service processing, presented herein and below.

Furthermore, the techniques and the systems presented herein and below (for real-time service processing) may include all or some combination of the components shown with the system 100. The methods are programmed as executable instructions in memory and/or non-transitory computer-readable storage media and executed on one or more processors associated with the components/devices.

Specifically, the system 100 includes a service integration server 110, a kiosk 120, a consumer-operated device 130, and a local enterprise service system 140.

The service integration server 110 includes a real-time service manager 111 and is located externally over a Wide-Area Network (WAN) from an enterprise service location having the kiosk 120, the consumer-operated device 130, and the local enterprise service system 140.

The real-time service processing system 100 is now discussed with reference to the FIG. 1 and within the context of a variety of operational scenarios.

The enterprise service location is a storefront for an enterprise, such as but not limited to: a restaurant, a grocery store, or other retail service location (selling goods or providing services to consumers).

The local enterprise service system 140 provides consumer order processing through network communication between the kiosk 120, the service integration server 110, and the local enterprise service system 140. In an embodiment, the service integration server 110 is an enhanced version of the Aloha® product offering distributed by NCR® Corporation of Duluth Ga. In an embodiment, the service integration server 110 is a backend system of the enterprise integrated with the Aloha® services and associated with the enterprise service location.

A consumer enters the enterprise service location for purposes of transacting for goods or services with the enterprise. The consumer includes a consumer-operated device 130, such as a mobile phone, tablet, or wearable processing device.

Next, the consumer interacts with a consumer-facing interface of the kiosk 120 for purposes of placing an order with the enterprise at the enterprise service location. This consumer-facing interface is enhanced to request a phone number that identifies the consumer-operated device 130.

In an embodiment, the identity of the consumer remains entirely anonymous through the entire process described herein and below. It is only the phone number of the consumer-operated device 130 that is entered into the enhanced interface of the kiosk 120.

The consumer enters the phone number into the enhanced kiosk interface 120 and proceeds to access existing interfaces of the kiosk 120 to place the consumer's order with the enterprise at the enterprise service location.

The phone number is communicated over the WAN to the real-time service manager 111 at the external network site of the service integration server 110. The real-time service manager is an enhancement to order processing in the manners discussed more completely herein and below.

The real-time service manager 111 communicates over the WAN back to the local enterprise service system 140 and minimal identifies an order number for the order, order details, and a time the order was placed.

Staff of the enterprise service location then begins preparation of the order based on the order details and/or the time the order was placed as communicated to the staff through interfaces associated with the local enterprise service system 140. The staff may or may not have access to the phone number associated with the order and as communicated from the kiosk 120 to the real-time service manager 111.

However, having the personal device number of the consumer-operated device 130 provides a level of personalization between the staff (through the interfaces of the local enterprise system 140) and the retail time service manager 111 (which can communicated over a WAN, such as a cellular network and/or Ethernet network directly in a Peer-to-Peer (P2P) fashion directly with the consumer).

Therefore, as different aspects of the order are completed, the staff enters completion or status information into the interface of the local enterprise service system 140, which is communicated to the real-time service manager 111 and which is then communicated to the consumer on the consumer-operated device 130.

For instance, and in an embodiment, the real-time service manager 111 receives an order completion message from the interface of the local enterprise service system 140 and, in real-time, constructs an automated human-readable Short Messaging System (SMS) text message that is sent to the previously entered phone number for the consumer-operated device 130 (the real-time service manager 111 maintaining a unique mapping between the order number for the order and the phone number for the consumer-operated device 130). The message can include instructions on where to pick up the order within the enterprise location as well as a reminder of the order number and/or order details. In an embodiment, the identity of the consumer can remain entirely anonymous during the entire processing from order placement at the kiosk 120 to order pickup at a designated location within the enterprise service location.

In an embodiment, the message sent from the real-time service manager 111 to the consumer-operated device 130 may also include an inducement for the consumer to register with a loyalty system managed for the enterprise, such as a message with a Uniform Resource Locator (URL) link included in the message to pick up the completed order that indicates if the consumer activates the link and registers with the loyalty system the consumer can receive some promotion the enterprise is willing to provide (assuming the consumer agrees to receiving promotions), such as a certain number of bonus loyalty points for initial enrollment, a free beverage, a discount on a next purchased product and the like.

In an embodiment, even if the consumer wishes to remain anonymous and does not provide any consumer identity information beyond a cell phone number, the real-time service manager 111 can still personalize that consumer's next visit to the enterprise service location by providing previous order details through an enhanced version of the kiosk 120 or through text messages when the consumer enters a next order at the kiosk 120. Moreover, marketing directed to behaviors and profiles associated with just the consumer's cell phone number can be processed in connection with marketing systems through interaction with the real-time service manager 111.

Additionally, assuming the consumer has registered the cell phone number or has the cell phone number already available within a loyalty system (accessible to the real-time service manager 111), then when the consumer enters the cell phone number the behavior and ordering profile of the consumer retained in the loyalty system can be updated based on the current order details (such as enterprise service location, time of day, day of week, ordering details, and the like).

In an embodiment, the real-time service manager 111 also includes an Application Programming Interface (API) for interacting with a loyalty system, such that when the consumer is known and located proper loyalty points or redemption of loyalty points as form of full payment or partial payment for the order can be processed through the real-time service manager 111.

In an embodiment, the real-time service manager 111 provides more detailed ordering information, such as sending an URL link that when accessed by the consumer from the consumer-operated device 130 dynamically renders a webpage having the consumer's order details and/or current status (such as received by the kitchen, being packaged, completed and ready for pick up).

In an embodiment, the real-time service manager 111 provides two-way communication between staff of the enterprise service location (through the enterprise service system 140 interfaces with the real-time service manager) and the consumer (through the real-time service manager 111 and text (SMS) commands issued by the consumer from the consumer-operated device 130). In an embodiment, the two-way communication is achieved through a dynamically rendered web page. During two-way communication, the consumer can interact (textually or through the dynamically rendered web page) to change an order, add to the order, or cancel some portion of the order or the entire order).

In an embodiment, communication between the real-time service manager 111 and the consumer-operated device 140 is achieved through an enterprise application of the enterprise service location that the consumer has previously downloaded and installed on the consumer-operated device. For example, the consumer can interact with the enhanced interface of the kiosk 120 and enter a phone number, which was previously linked by the real-time service manager 111 to a registered consumer and a downloaded enterprise application (downloaded and installed on the consumer-operated device 130). A message (push notification) can be sent to the consumer-operated device's installed operating system (OS) raising a notification or a wake-up event to cause the enterprise application to wake up or initiate on the consumer-operated device 130 (such OS features are available in Apple's iOS™). Communication between the real-time service manager 111 and the consumer-operated device 130 processes using network connectivity (cellular or Wi-Fi) and API message passing calls. Any of the above-mentioned embodiments for notifications, status, and two-way communication can be processed through the API message passing calls, such that text (SMS) communication need not be done (but still can be if desired by the registered consumer through profile settings).

One now appreciates how consumer ordering and status can be personalized based on a phone number for the consumer's device 130 in an anonymous fashion with the staff handing an order of the consumer or personalized based on a registered consumer's device 130 to link and update with profiles known and retained for the consumer.

These and other embodiments are now discussed with reference to the FIGS. 2-4.

Figure 2:
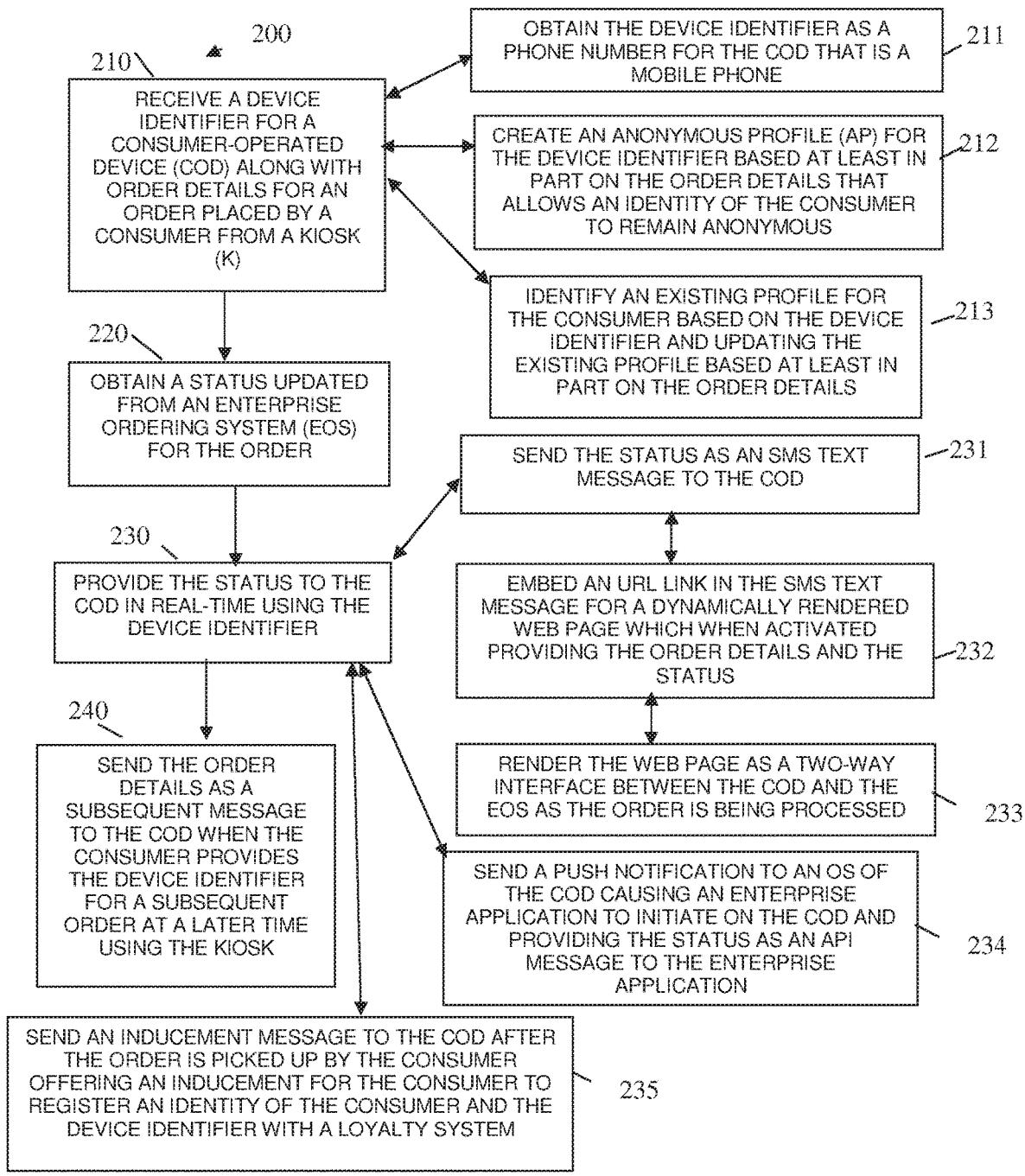
FIG. 2 is a diagram of a method for real-time service processing, according to an example embodiment.

FIG. 2 is a diagram of a method 200 for real-time service processing, according to an example embodiment. The software module(s) that implements the method 200 is referred to as an "order integration manager." The order integration manager is implemented as executable instructions programmed and residing within memory and/or a non-transitory computer-readable (processor-readable) storage medium and executed by one or more processors of a device. The processor(s) of the device that executes the order integration manager are specifically configured and programmed to process the order integration manager. The order integration manager has access to a network during its processing. The network can be wired, wireless, or a combination of wired and wireless.

In an embodiment, the device that executes the order integration manager is a cloud processing environment.

In an embodiment, the device that executes the order integration manager is a remote server that is geographically remote to an enterprise service location. In an embodiment, the remote server is the service integration server 110 of the FIG. 1.

In an embodiment, the device that executes the order integration manager is a local server that is local to an enterprise service location.

In an embodiment, the order integration manager is the real-time service manager 111 of the FIG. 1.

At 210, the order integration manager receives a device identifier for a consumer-operated device along with order details for an order placed by a consumer from a kiosk. In an embodiment, consumer-operated device is a different device from the kiosk. That is the consumer-operated device is owned and operated by the consumer.

According to an embodiment, at 211, the order integration manager creates an anonymous profile for the device identifier based at least in part on the order details that allows an identify of the consumer to remain anonymous. Here, the order details, device identifier, time of the order, place of the order, kiosk identifier, and day of the order are retained for personalizing the consumer's experience for any subsequent ordering that takes place at the kiosk.

In an embodiment, at 212, the order integration manager creates an existing profile for the consumer based on the device identifier and updating the existing profile based at least in part on the order details. Here, the device identifier for the consumer-operated device is already previously registered to an identity of the consumer and the order details can be used to update the existing profile for that consumer.

At 220, the order integration manager obtains a status that is updated from an enterprise ordering system for the order. In an embodiment, the enterprise is a restaurant and the enterprise ordering system is a kitchen based system where staff updates status with the Aloha® product offered by NCR® Corporation of Duluth Ga. and the order integration manager is an enhancement to the Aloha® product.

In an embodiment, the status is only obtained after the enterprise ordering system takes some action that is communicated back to the order integration manager.

At 230, the order integration manager provides the status to the consumer-operated device in real-time or near real-time using the device identifier to direct the status to the consumer-operated device over a WAN connection (such as cellular and/or WiFi).

In an embodiment, at 231, the order integration manager sends the status as a Short Messaging System (SMS) text message to the consumer-operated device.

In an embodiment of 231 and at 232, the order integration manager embeds an URL link within the SMS text message for dynamically rendering a web page which when activated provides the order details and the status from a web browser executing on the consumer-operated device. The order integration manager creates the instructions embedded within the URL link for the web page using the device identifier and order details and the web page is generated either by the order integration manager or another web-based service by processing the instructions when the consumer touches the URL link on a touch screen interface within the SMS text message. In an embodiment, the URL discussed above is pushed to a mobile application associated with the enterprise where the mobile application executes on the consumer-operated device.

In an embodiment of 232 and at 233, the order integration manager renders the web page (through the construction of the instructions embedded in the URL link) as a two-way interface between the consumer-oriented device and the enterprise ordering system as the order is being processed within the enterprise. This was discussed above and permits the consumer and the enterprise staff fulfilling the order to interact with one another through the dynamically rendered web page interface mechanism.

In an embodiment, at 234, the order integration manager sends a push notification to an OS of the consumer-operated device that causes the OS to initiate or wake up an enterprise application on the consumer-operated device. The order integration manager then provides the status as an API message sent to the enterprise application. In an embodiment the URL discussed above either a one way or two way rendered webpage is provided to the enterprise mobile application executing on the consumer-operated device.

In an embodiment, at 235, the order integration manager sends an inducement message to the consumer-operated device after the order is picked up by the consumer within the enterprise. The inducement message offers an inducement for the consumer to register a consumer identity and the device identifier with a loyalty system, which may be for the loyalty system of the enterprise.

According to an embodiment, at 240, the order integration manager sends the order details as a subsequent message to the consumer-oriented device when the consumer provides the device identifier for a subsequent order at a later time using the kiosk within the enterprise. This provides customization and may allow the consumer to review what the consumer previously ordered. It is noted that this level of personalization can be done with or without knowing a consumer identity for the consumer (as discussed above).

Figure 3:
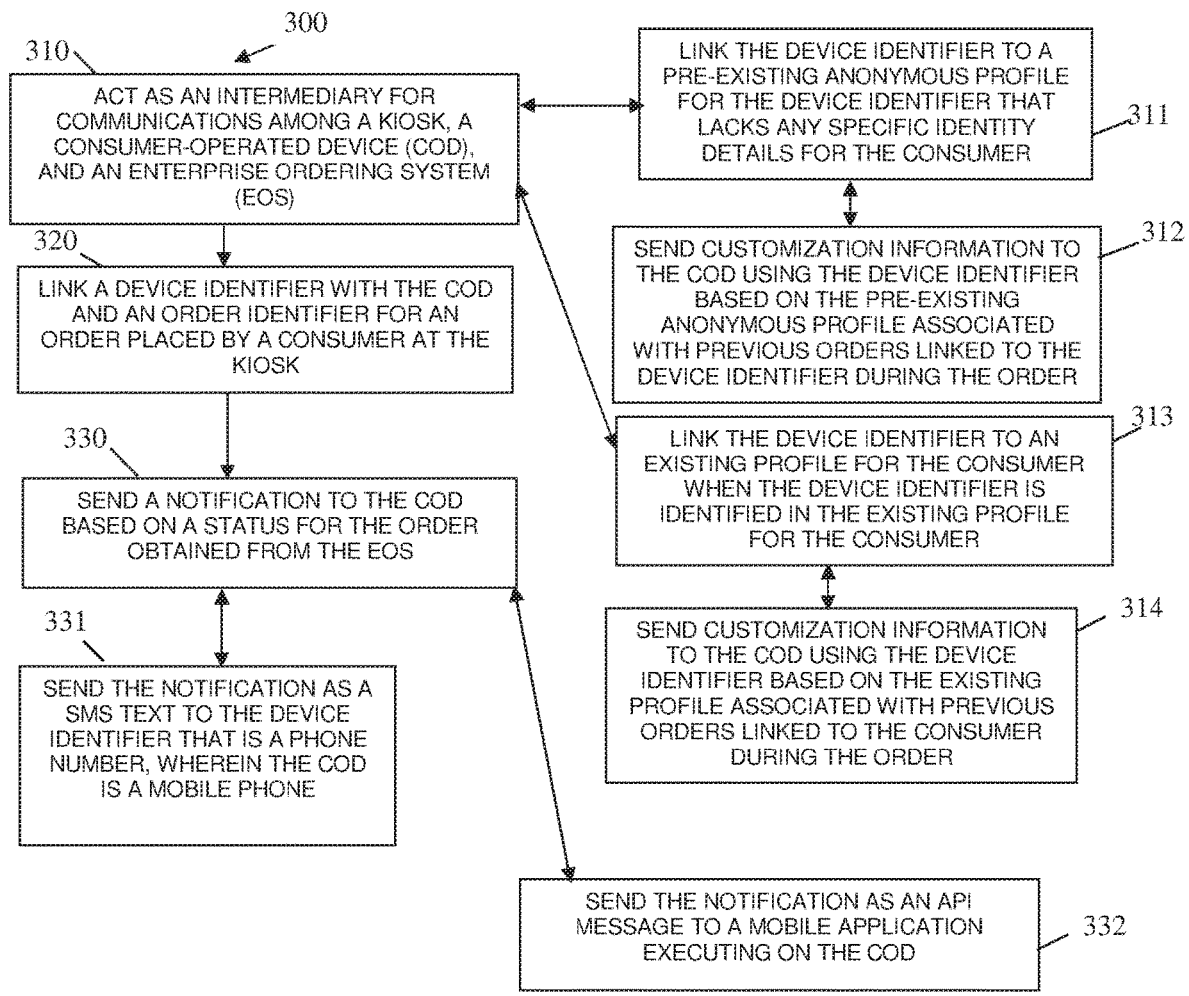
FIG. 3 is a diagram of another method for real-time service processing, according to an example embodiment.

FIG. 3 is a diagram of another method for real-time service processing, according to an example embodiment. The software module(s) that implements the method 300 is referred to as an "order notification service." The order notification service controller is implemented as executable instructions programmed and residing within memory and/or a non-transitory computer-readable (processor-readable) storage medium and executed by one or more processors of a hardware device. The hardware processors that execute the order notification service are specifically configured and programmed to process the order notification service. The order notification service has access to one or more networks during its processing. Each network can be wired, wireless, or a combination of wired and wireless.

In an embodiment, the order notification service is the real-time service manager 111 of the FIG. 1.

In an embodiment, the order notification service is the method 200 discussed above with the FIG. 2.

In an embodiment, the device that executes the order notification service is a cloud processing environment having one or more hardware devices logically cooperating with one another as a single remote processing environment.

In an embodiment, the device that executes the order notification service is the server integration server 110 of the FIG. 1.

In an embodiment, the device that executes the order notification service is a local server that is local to an enterprise service location where a consumer places an order for goods or services.

In an embodiment, the order notification service presents another and in some ways enhanced processing perspective from that which was presented above with the method 200 of the FIG. 2.

At 310, the order notification service acts as an intermediary for network-based communications among an ordering kiosk, a consumer-operated device, and an enterprise ordering system operated by staff of an enterprise at the enterprise location where the consumer is placing an order through interaction with an interface of the kiosk.

According to an embodiment, at 311, the order notification service links the device identifier to a pre-existing anonymous profile for the device identifier that lacks any specific identity details for the consumer.

In an embodiment of 311 and at 312, the order notification service sends customization information to the consumer-operated device using the device identifier based on the pre-existing anonymous profile associated with previous orders and previous order details linked by the order notification service to the device identifier. The customization information provided to the consumer-operated device while the consumer is interacting with the kiosk to place the order.

According to an embodiment, at 313, the order notification service links the device identifier to an existing profile for the consumer when the device identifier is identified in the existing profile for the consumer.

In an embodiment of 313 and at 314, the order notification service sends customization information to the consumer-operated device identifier based on the existing profile associated with previous orders and previous order details linked to the consumer during the order (while the consumer is placing the order through the kiosk consumer-facing interface).

At 320, the order notification service links a device identifier with the consumer-operated device and an order identifier for an order placed by the consumer at the kiosk (through the kiosk consumer-facing interface).

At 330, the order notification service sends a notification to the consumer-operated device based on a status (received, in-progress, waiting, and/or ready for pick up (completed)) for the order obtained from the enterprise ordering system.

In an embodiment, at 331, the order notification service sends the notification as an SMS text to the device identifier that is phone number for the consumer-operated device, which is a mobile phone of the consumer.

In an embodiment, at 332, the order notification service sends the notification as an API message to a mobile application executing on the consumer-operated device (this situation and a mechanism for implement this situation was discussed above with reference to the FIG. 1).

Figure 4:
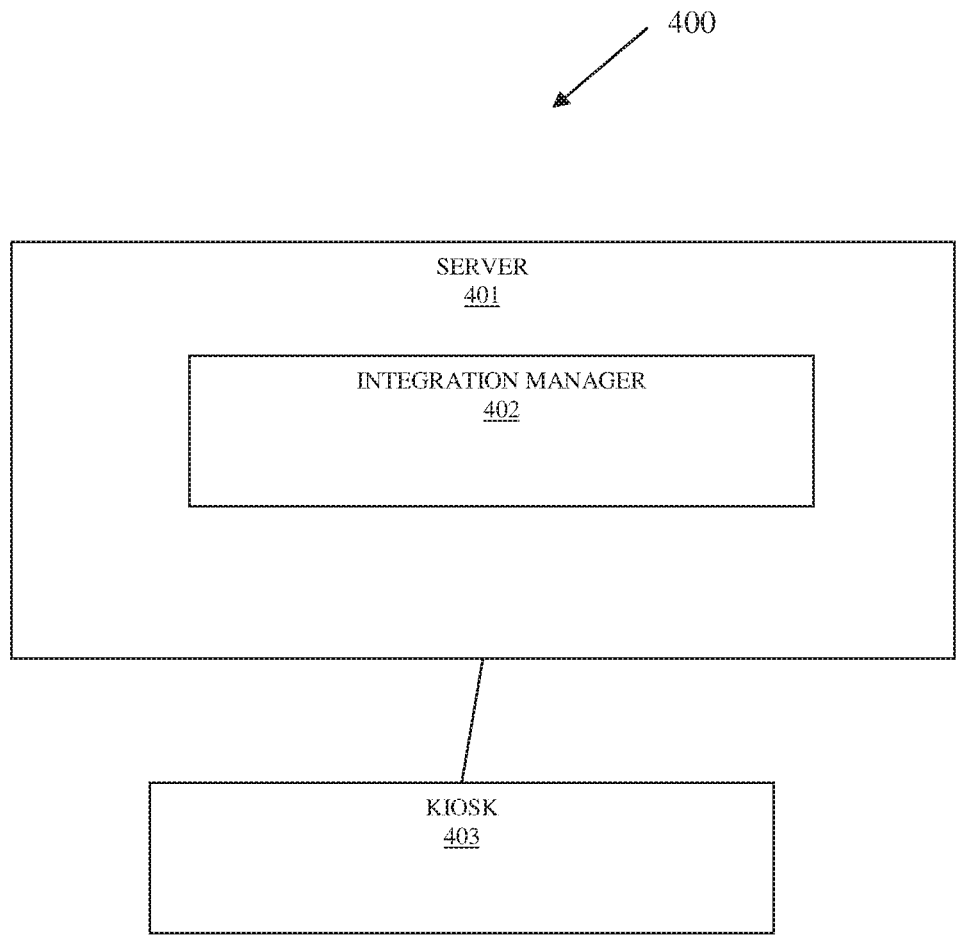
FIG. 4 is a diagram of another real-time service processing system, according to an example embodiment.

FIG. 4 is a diagram of another real-time service processing system 400, according to an example embodiment. Some components of the real-time service processing system 400 are programmed and reside within memory and/or a non-transitory computer-readable medium and execute on one or more hardware processors of the real-time service processing system 400. The real-time service processing system 400 communicates over one or more networks, which can be wired, wireless, or a combination of wired and wireless.

In an embodiment, the real-time service processing system 400 is the system 100 of the FIG. 1.

In an embodiment, real-time service processing system 400 implements, among other things, the processing discussed in the FIGS. 1-3.

The real-time service processing system 400 includes a hardware server 401, and integration manager 402, and a kiosk 403.

In an embodiment, the hardware server 401 is the service integration server 110 of the FIG. 1.

In an embodiment, the hardware server 401 is the device that executes the instructions associated with any of the methods 200 and 300 of the FIGS. 2 and 3, respectively.

The integration manager 402 is configured to: execute on one or more hardware processors of the hardware server 401, receive a device identifier for a consumer-operated device from the kiosk 403 during an order placed by a consumer while interacting with an interface of the kiosk 403, and send a status that is updated from an enterprise ordering system for the order to the consumer-operated device using the device identifier.

In an embodiment, the integration manager 402 is the real-time service manager 111 of the FIG. 1.

In an embodiment, the integration manager 402 is the method 200 of the FIG. 2.

In an embodiment, the integration manager 402 is the method 300 of the FIG. 3.

In an embodiment, the integration manager 402 is some combination of the real-time service manager 111, the method 200, and/or the method 300.

In an embodiment, the device identifier is a phone number and the consumer-operated device is a mobile phone.

In an embodiment, the device identifier is an Internet Protocol (IP) address for accessing and communicating with the consumer-operated device (which may be a mobile phone, a tablet, a lap top, and/or a wearable processing device.

In an embodiment, the device identifier is a phone number not accessible of cellular networks but mapped to an accessible via an IP address, such as phone numbers assigned and linked to processing devices using Ethernet protocol over the Internet in audio-based, text-based, and/or video based products.

In an embodiment, the status is a SMS text message having an embedded URL link to a dynamically rendered web page having the status and order details for the order and accessible on the consumer-oriented device when the link is activated by the consumer within the SMS text message.

The kiosk 403 is configured with an interface to interact with a consumer for placing an order at an enterprise service location. The kiosk is also configured with an interface or API for interacting with the integration manager 402 of a WAN network connection.

In an embodiment, the kiosk 403 is the kiosk 120 of the FIG. 1.

In an embodiment, the kiosk is a different device from the consumer-oriented device.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing executable instructions from a non-transitory computer-readable storage medium to a processor of a cloud device of a cloud processing environment causing the processor to perform operations comprising:
receiving a device identifier for a consumer-operated device along with order details for an order placed by a consumer on a kiosk through a kiosk interface over a wide-area network (WAN), wherein receiving further includes receiving the device identifier and the order details in real time from the kiosk after provided through the kiosk interface on the kiosk by the consumer, wherein order details for the order are provided by the customer through an existing interface of the kiosk while the device identifier is provided through an enhanced kiosk interface representing the kiosk interface, and wherein the kiosk interface obtains the order details from the existing kiosk interface after receiving the device identifier;
obtaining a status updated from an enterprise ordering system for the order, wherein obtaining further includes obtaining the status in real time as entered by staff into an enterprise ordering system interface of the enterprise ordering system, wherein ordering further includes matching the status with the order details and obtaining the device identifier;
providing the status to the consumer-operated device in real-time using the device identifier, generating a link having instructions using the device identifier and the order details, and providing the link with the status, wherein providing further includes sending the status as a Short Messaging System (SMS) text message to the consumer-operated device, and wherein sending the status further includes embedding the link as a Uniform Resource Locator (URL) link within the SMS text message, causing a dynamically rendering of a web page when activated that provides the order details and the status;
rendering the web page on the consumer-operated device based on activation of the link to the order that is activated on the consumer-operated device by the consumer using the instructions in the link and providing two-way communications with respect to the order to both the consumer via the consumer-operated device and the staff via the enterprise ordering system through the web page;
acquiring changes to the order details as received from the consumer through the web page of the consumer-operated device and communicating the changes to the enterprise ordering system;
personalizing subsequent orders received from the consumer-operated device based on entry of the device identifier without obtaining an identity for the consumer and without having to disclose the identity to the enterprise ordering system;
updating a loyalty account with the order details through a loyalty system when the device identifier for the consumer is associated with the loyalty account of the loyalty system by processing an Application Programming Interface (API), interacting with the loyalty system, and identifying available loyalty points from the loyalty account; and
processing a payment for the order when the device identifier is associated with the loyalty account, wherein processing the payment further includes using the available loyalty points as a partial payment for the order.

2. The method of claim 1, wherein receiving further includes obtaining the device identifier as a phone number for the consumer-operated device that is a mobile phone.

3. The method of claim 1, wherein receiving creating an anonymous profile for the device identifier based at least in part on the order details that allows the identity of the consumer to remain anonymous.

4. The method of claim 1, wherein receiving further includes identifying an existing profile for the consumer based on the device identifier and updating the existing profile based at least in part on the order details.

5. The method of claim 1, wherein embedding further includes rendering the web page as a two-way interface between the consumer-operated device and the enterprise ordering system as the order is being processed.

6. The method of claim 1, wherein providing further includes sending a push notification to an operating system of the consumer-operated device causing an enterprise application to initiate on the consumer-operated device and providing the status as an API message to the enterprise application.

7. The method of claim 1, wherein providing further includes sending an inducement message to the consumer-operated device after the order is picked up by the consumer offering an inducement for the consumer to register the identity of the consumer and the device identifier with the loyalty system.

8. The method of claim 1 further comprising, sending, by the executable instructions, the order details as a subsequent message to the consumer-operated device when the consumer provides the device identifier for a subsequent order at a later time using the kiosk.

9. A method, comprising:
providing executable instructions from a non-transitory computer-readable storage medium to a processor of a cloud device of a cloud processing environment causing the processor to perform operations comprising:
acting as an intermediary for communications among a kiosk operated by a consumer, a consumer-operated device operated by the consumer, and an enterprise ordering system operated by staff wherein acting as the intermediary for the kiosk further includes providing an enhanced kiosk interface to the kiosk for obtaining a device identifier for consumer-operated device and for obtaining order details for an order obtained by an existing kiosk interface of the kiosk from the consumer during an order;

linking the device identifier with the consumer-operated device provided by the consumer on the kiosk and an order identifier for the order placed by the consumer at the kiosk provided by the enterprise ordering system;

sending a notification to the consumer-operated device based on a status for the order obtained from the enterprise ordering system, wherein sending further includes receiving the status from the staff that enter the status into an enterprise ordering system interface of the enterprise ordering system, matching the status to the order identifier, obtaining the device identifier using the order identifier, and sending the notification using the device identifier, wherein sending further includes generating a link having instructions using the device identifier and the order details for the order, and providing the link with the notification, wherein sending further includes sending the notification with the link embedded in the notification as a Short Messaging System (SMS) text to the device identifier, and wherein sending the notification further includes embedding the link as a Uniform Resource Locator (URL) link in the SMS text message, causing a dynamically rendering of a web page when activated that provides the notification;

rendering the web page on the consumer-operated device based on activation of the link to the order that is activated on the consumer-operated device by the consumer using the instructions and providing two-way communications with respect to the order to both the consumer and the staff through the web page;

acquiring changes to the order as received from the consumer through the web page of the consumer-operated device and communicating the changes to the enterprise ordering system;

personalizing subsequent orders received from the consumer-operated device based on entry of the device identifier without obtaining an identity for the consumer and without having to disclose the identity to the enterprise ordering system;

updating a loyalty account with the order details through a loyalty system when the device identifier for the consumer is associated with the loyalty account of the loyalty system by processing an Application Programming Interface (API), interacting with the loyalty system, and identifying available loyalty points from the loyalty account; and processing a payment for the order when the device identifier is associated with the loyalty account, wherein processing the payment further includes using the available loyalty points as a partial payment for the order.

10. The method of claim 9, wherein linking further includes linking the device identifier to a pre-existing anonymous profile for the device identifier that lacks any specific identity details for the consumer.

11. The method of claim 10, wherein linking further includes sending customization information to the consumer-operated device using the device identifier based on the pre-existing anonymous profile associated with previous orders linked to the device identifier during the order.

12. The method of claim 9, wherein linking further includes linking the device identifier to an existing profile for the consumer when the device identifier is identified in the existing profile for the consumer.

13. The method of claim 12, wherein linking further includes sending customization information to the consumer-operated device using the device identifier based on the existing profile associated with previous orders linked to the consumer during the order.

14. A system, comprising:
a server having a processor and a non-transitory computer-readable storage medium;
the non-transitory computer-readable storage medium comprising executable instructions ;
a kiosk; and
the executable instructions executed by the processor of a cloud device from the non-transitory computer-readable storage medium within a cloud processing environment causes the processor to perform operations comprising:

receiving a device identifier for a consumer-operated device from an enhanced kiosk interface of the kiosk during an order placed by a consumer while the consumer interacts with an existing interface of the kiosk to place the order at the kiosk and receiving from the enhanced kiosk interface a consumer-operated device identifier for the consumer-operated device and receiving an order identifier for the order that is generated by an enterprise ordering system and provided by the existing kiosk interface of the kiosk;

sending a status updated from an enterprise ordering system for the order to the consumer-operated device using the device identifier, wherein the status provided by staff through an enterprise ordering system interface, the status is matched to the order identifier, the device identifier is obtained using the order identifier, and the status is sent to the consumer-operated device using the device identifier with an embedded link, and the embedded link including instructions generated using the device identifier and order details for the order, wherein sending further includes sending the status as a Short Messaging System (SMS) text to the device identifier, and wherein sending further includes providing the embedded link as a Uniform Resource Locator (URL) link within the SMS text message, causing a dynamically rendering of a web page when activated that provides the the status;

rendering the web page on the consumer-operated device based on activation of the link to the order that is activated on the consumer-operated device by the consumer using the instructions and provide two-way communications with respect to the order to both the consumer and the staff through the web page;

acquiring changes to the order as received from the consumer through the web page of the consumer-operated device and communicating the changes to the enterprise ordering system;

personalizing subsequent orders received from the consumer-operated device based on entry of the device identifier without obtaining an identity for the consumer and without having to disclose the identity to the enterprise ordering system;

updating a loyalty account with the order details through a loyalty system when the device identifier for the consumer is associated with the loyalty account of the loyalty system by processing an Application Programming Interface (API), interacting with the loyalty system, and identifying available loyalty points from the loyalty account; and processing a payment for the order when the device identifier is associated with the loyalty account and allowing a partial payment for the order to be processed using the available loyalty points associated with the loyalty account;

wherein the status is a Short Messaging System (SMS) text message having the link to the web page having the status and the order details for the order and accessible on the consumer-operated device when the link is activated by the consumer within the SMS text message.

15. The system of claim 14, wherein the kiosk is a different device from the consumer-operated device.

\* \* \* \* \*